(12) United States Patent
Simons

(10) Patent No.: US 6,842,178 B2
(45) Date of Patent: Jan. 11, 2005

(54) ANIMATED GRAPHIC IMAGE GENERATION AND CODING

(75) Inventor: Paul R. Simons, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 387 days.

(21) Appl. No.: 09/874,414

(22) Filed: Jun. 5, 2001

(65) Prior Publication Data

US 2001/0050685 A1 Dec. 13, 2001

(30) Foreign Application Priority Data

Jun. 7, 2000 (GB) .............................................. 0013764

(51) Int. Cl.$^7$ .......................................... G06T 13/00
(52) U.S. Cl. .................................................... 345/473
(58) Field of Search ................................ 345/473, 474, 345/418; 382/232; 707/104

(56) References Cited

U.S. PATENT DOCUMENTS

| 4,745,474 A | * | 5/1988 | Schiff ..................... 375/240.05 |
| 4,805,017 A | * | 2/1989 | Kaneko et al. ........... 348/401.1 |
| 5,784,001 A | | 7/1998 | Deluca et al. .......... 340/825.44 |
| 5,850,481 A | * | 12/1998 | Rhoads ........................ 382/232 |
| 6,058,397 A | * | 5/2000 | Barrus et al. ............. 707/104.1 |
| 6,130,898 A | * | 10/2000 | Kostreski et al. ............ 370/522 |
| 6,141,012 A | * | 10/2000 | Bollman et al. ............. 345/418 |
| 6,326,971 B1 | * | 12/2001 | Van Wieringen ............ 345/474 |

FOREIGN PATENT DOCUMENTS

WO     WO9937095     7/1999     ............. H04N/7/26

* cited by examiner

Primary Examiner—Don Wong
Assistant Examiner—Huedung X. Cao
(74) Attorney, Agent, or Firm—Dicran Halajian

(57) ABSTRACT

A method for generating and coding animated graphic images for transmission to hand-held or mobile devices uses an object-component technique wherein images are composed from a limited set of component types, particularly points and polygons. An initial frame is defined as a list of objects to be displayed. Subsequent frames are encoded as a list of changes to the objects to the previous frame.

9 Claims, 5 Drawing Sheets

| Command ID | Command | Payload |
|---|---|---|
| 0 | Begin Frame | (None) |
| 1 | Repeat Previous Frame | No. Frames to Repeat |
| 2 | Define Shape | Shape ID, Definition of Shape's Objects (See Figure 4) |
| 3 | Place Shape | Shape ID, Render ID, Colour, Xpos, Ypos |
| 4 | Move Absolute | Render ID, Xpos, Ypos |
| 5 | Move Relative | Render ID, Xmove, Ymove |
| 6 | Resize Shape | Render ID, Xscalefactor, Yscalefactor |
| 7 | Remove Shape | Render ID |
| 8 | Shape Movement Vector | Render ID, Xmove, Ymove |
| 9 | Begin Loop | No. Repeats, Commands to Loop |
| 10 | End Loop | (none) |

| Object | Type |
|--------|------|
| 11 | Black unfilled polygon, with 1 edge. |
| 12 | Black unfilled polygon, 4 edges. |
| 13 | Black filled polygon, 7 edges. |
| 14 | White filled polygon, 4 edges. |
| 15 | Black text string. |
| 16 | Black point, radius 1. |
| 17 | Black point, radius 4. |
| 18 | Black filled polygon, 7 edges. |
| 19 | Black text string. |
| 20 | White filled polygon, 4 edges. |

FIG. 3
| CC. | Command | Parameter (p) | Data to follow |
|---|---|---|---|
| 00 | Point | Radius of point (0=1 pixel) | 1 Coordinate word, specifying the location of the point to plot. |
| 01 | Text | Reserved (Set to 0) | 1 Coordinate word, followed by a variable number of 7-bit ASCII characters, terminated by a NULL |
| 10 | Open Polygon | Number of points - 2 | (p+2) Coordinate words specifying each point in the polygon. |
| 11 | Filled Polygon | | |
FIG. 4
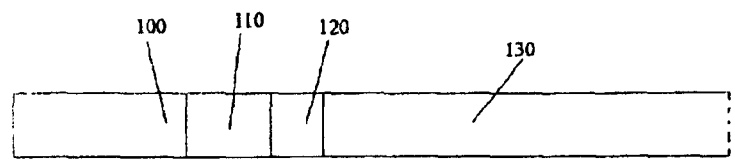
Fig. 5

| Command ID | Command | Payload |
|---|---|---|
| 0 | Begin Frame | (None) |
| 1 | Repeat Previous Frame | No. Frames to Repeat |
| 2 | Define Shape | Shape ID, Definition of Shape's Objects (See Figure 4) |
| 3 | Place Shape | Shape ID, Render ID, Colour, Xpos, Ypos |
| 4 | Move Absolute | Render ID, Xpos, Ypos |
| 5 | Move Relative | Render ID, Xmove, Ymove |
| 6 | Resize Shape | Render ID, Xscalefactor, Yscalefactor |
| 7 | Remove Shape | Render ID |
| 8 | Shape Movement Vector | Render ID, Xmove, Ymove |
| 9 | Begin Loop | No. Repeats, Commands to Loop |
| 10 | End Loop | (none) |

FIG. 6

| OBJECT | TYPE |
|---|---|
| 50 | Black, filled polygon, 4 edges |
| 51 | Black, Bezier curve |
| 52 | Black line |
| 53 | Bit map |
| 54 | Black point |
| 55 | Black text string |
| 56 | Black, unfilled ellipse |

ANIMATED GRAPHIC IMAGE GENERATION AND CODING

The present invention relates to the formation, manipulation and coding of animated graphic images and particularly, but not exclusively, to the coding of animated graphic objects for transmission to, and/or reception from, hand-held or mobile devices of one of more remote users.

The majority of the current generation of hand-held mobile devices are driven by text-based user interfaces. Through these interfaces, the user is able to browse the handsets range of functionality and select and perform the required tasks. Such mobile devices can also exchange information using protocols such as the Short Message Service (SMS) that is part of the Global System for Mobile communications (GSM) digital standard. These text-based displays have a limited capability and lack the flexibility and appeal of graphical information. Increasingly, there is a desire to incorporate graphical information to improve both the functionality and ease of use of the user interface and the exchange of information.

There already exist a large number of graphics standards such as GIF (Graphics Interchange Format), JPEG (Joint Photographic Experts Group) and PNG (Portable Network Graphics). Each of theses graphics standards require storing the value of every single pixel of an image. Even though these formats employ sophisticated compression algorithms to reduce the size of the respective image file, images still require a significant amount of storage space. In view of the limited storage capacity of hand-held mobile devices and also the limited bandwidth available for transmission and reception, only a limited number of devices support these graphics standards and, even if they are supported, it is often the case that only one or two images can be stored. In addition, transmitting such images is a time-consuming and costly affair.

In International Patent Application WO99/37095 (Koninklijke Philips Electronics N.V.) the formation, manipulation and coding of graphic images using scalable vector graphics is described. In order to permit the direct transmission of graphic images to hand-held or mobile devices, a component object specification is used which describes an image by the objects comprising it (lines, polygons, points/circles etc.). There is a favourable trade-off between the generally small overall size of the encoded image, and the level of processing required in the display device. The principal advantage of sending images in component object form is the size of the encoded image. For simple line drawings, the low-redundancy nature of the encoding can result in considerable savings over a bitmap-based encoding technique. A useful additional feature is that the image can be easily scaled to an arbitrary size at the point of display, allowing the image sent to be displayed consistently regardless of the display device. In this manner, only limited bandwidth is required for transmission and receipt and only limited storage capacity is needed on the device.

Whilst this approach has proven to be successful, it has only allowed for a limited number of screen objects to be specified and displayed at any one time. In order to increase the useability and general user friendliness of such hand-held mobile devices, it is desirable that they are able to store, receive, transmit and display simple animations of images.

According to a first aspect of the present invention, there is provided a method for generating and coding for transmission an animated graphic image, comprising the steps of:
composing a first frame of the image from a plurality of component objects from a predetermined set of object types, the composition including scaling and location of each object within a fixed coordinate set image field;
coding the first frame as an ordered rendering list of the component objects, the rendering list identifying the order in which the component objects are to be rendered on regeneration of the image;
sequentially coding each subsequent frame (n) as a number of data words representing the difference between that frame (n) and the previous frame (n−1).

The data words coding each subsequent frame (n) may identify new component objects to be added or component objects from the previous frame (n−1) to be moved, transformed or removed.

The method may include the step of defining a shape as a plurality of component objects, wherein the definition of the shape is transmitted with the animated graphic image and wherein references to the shape in the animated graphic image are replaced with the component objects when generated.

The data words may include selected ones of place object, place shape, move absolute, move relative, resize and remove, so as will be defined in terms of exemplary embodiments hereafter.

According to another aspect of the present invention, there is provided a portable communications apparatus configured to receive and decode animated graphics images generated and coded in accordance with the method as herein described, the apparatus comprising:
a display device coupled with a display driver system arranged to format images for display;
a processor arranged to reconstruct the coded image;
a receiver coupled with said display driver and configured to receive the coded image data and pass it to the processor;
first storage means containing said object and animation identifier codes, and second storage means for storing reconstructed image frames;
wherein the processor is arranged to reconstruct individual frames of the animation by identifying and reconstructing objects from object identifier codes and by applying animation transforms to objects from previous frames in dependence on animation codes.

The display driver system may include the processor, the first storage means and the second storage means.

The display driver system may be a vector graphics system

The present invention allows animated graphics to be defined in a highly compressed way. Instead of the conventional method of playing a sequence of bitmaps, a vector graphics format is defined which describes images in terms of their structural components although, as described hereinafter, the present invention is not incompatible with use of bitmaps and may incorporate them as another structural component. Once defined from structural components, shapes can be placed on a screen, grouped together, copied, resized and moved to produce a graphical animation. In addition, the described vector graphics format minimizes the processing requirements on the target platform, thus making it particularly suitable for hand-held devices.

Examples of the present invention will now be described in detail with reference to the accompanying drawings, in which:

FIG. 3 represents the bit structure of a command word identifying an object;

FIG. 4 is a table of object type bit values from the command word of FIG. 3 and their respective meanings;

FIG. 5 represents the bit structure of FIG. 3 adapted to include animation command words;

FIG. 6 is a table of animation type bit values from the command word of FIG. 5 and their respective meanings;

Figures 1, 2:
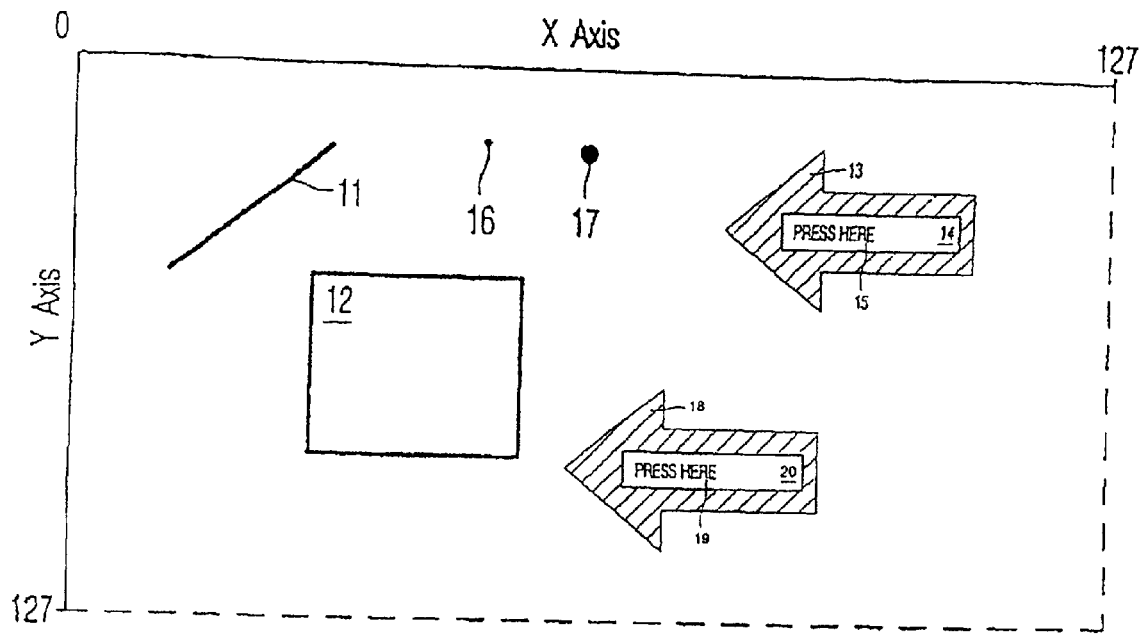
FIG. 1 is an example component image formed from 10 objects.
FIG. 2 is a table of the respective properties of each of the objects in the image of FIG. 1.

Component object images as used in the following examples are comprised of three main drawing objects: points, text, and polygons; a polygon may have between one and nine edges and, assuming a monochrome or two-colour display, may be filled or unfilled. Each object can be drawn in either "black" (with pixels set) or white (pixels are cleared). FIG. 1 shows an example component object image 10 constructed from a total of ten objects 11–20. Note that it is possible to overlay objects on top of each other; objects are drawn in the order in which they are specified in the encoded data stream and the encoded data therefore represents an ordered list of display objects. This implicit information (i.e. the number of the object in the list) does not need to be communicated explicitly but may be used to return information to the originator of the image (for example the number of an object which the user has selected).

As an example, the properties of each object in the example image of FIG. 1 are as shown in the table of FIG. 2. Because object 14 (a white filled polygon) was drawn after object 13 (black filled polygon) it appears on top of the arrow-shaped polygon 13. Likewise the text string (object 15) appears on top of the white filled polygon 14.

All vertices in component object images are specified in a fixed coordinate image field using the XY coordinate system shown in FIG. 1, with the origin in the top left hand corner and a range 0–127 for each axis. Although the image field is "square" (the ranges for the X and Y axes are the same), the display device is unlikely to be. The image will be scaled in the terminal to fit the display.

Although the exact display resolution of the targetted display is not necessarily known when an image is being drawn, it is suggested that images are designed to be drawn with an aspect ratio consistent with the display device, where known: the aspect ratio is the ratio of width to height such that a display 160 pixels wide and 64 pixels high would have an aspect ratio of 2.5 and the source images should be scaled accordingly. Alternatively, the operator could specify in a header to the message containing a component object image the intended display resolution and arrange for the terminal to scale the data accordingly.

The encoding of data is intended to be particularly compact: every operation such as an object to be drawn or moved is represented by a command word followed by a variable length of data. The data may be characters (7-bit ASCII) or coordinates (14-bits). It is assumed in this example that the receiver/decoder knows in advance the length of the component object data, and therefore there is no explicit termination; a number of mechanisms may be used to communicate this to the display terminal as will be well understood-for example it may form part of the SMS packet header, if a GSM mobile telephone was the receiving device.

The commands are formatted as 7-bit words of data. The overall bit format is as shown in FIG. 3, with all data being encoded in the order of most-significant to least significant bit. The first bit, c, is the colour bit and indicates whether the object perimeter line is to be drawn in the background colour ("white"; c=0) or the foreground colour ("black"; c=1). The next two bits, CC, indicate the type of object (point, text, filled or unfilled polygon), as identified in the table of FIG. 4. Following CC is one bit, s, indicating whether or not the object may be selected at the device of a receiving user (0=no; 1=yes), then three bits, ppp, to specify a parameter value of 0–7. The meaning of the three parameter bits, ppp, depends on the object type CC selected (described below).

Commands may be followed by coordinates in terms of the image field. With 14 bits for the coordinates, the first seven bits give a value 0–127 for the X coordinate, and the other seven bits give a value 0–127 for the Y coordinate.

FIG. 5 represents the bit structure of FIG. 3 adapted to include animation command words. The command words are adapted to include a 4 bit command identifier 100, a 3 bit identifier 110 reserved for future use followed by a payload length identifier 120 and the payload itself 130. The command identifier 100 defines one of a number of possible command actions. The payload length 120 defines the payload as an 8 bit number if low (0) or a 16 bit number if high (1). In this manner, when processing the command word, irrelevant command words can be skipped as can those that the processor does not understand. Thus, backward compatibility is ensured. The payload itself is dependent on the particular command identifier. Types of command identifiers and corresponding payloads are shown in the table of FIG. 6.

Instead of defining and referring to individual screen objects such as those of FIGS. 1 to 4, it is preferable that objects are grouped together to define shapes that can then be manipulated. The "define shape" command word allows a shape to be defined by the payload of the command word. In this case, the payload would be one or more object command words such as those defined with reference to FIGS. 1 to 4. Defined shapes are then stored in a dictionary, referenced by a shape identifier, in a memory and can subsequently be placed on the screen and manipulated with reference to the shape identifier. For example, the arrow shaped compound figures in FIG. 1 defined by objects 13 to 15 and 18 to 20 could be defined as a single shape in the dictionary. In this manner, the defined shape could be written to the display in a first position to give the shape 13 to 15 and then in a second position to give that of 18 to 20. A single shape definition command and two shape write commands replaces the six object commands that were previously necessary to draw the two shapes.

An animated scaleable vector graphics file preferably comprises a header followed by one or more shape definition command words followed by a number of frame manipulation commands. In order to display the animated vector graphics file, the defined shapes are loaded into a dictionary in memory and a render list is then generated for each frame in turn. Each render list includes details of each shape to be placed on screen, in terms of the shapes x position, y position, scaling, any movement vector and the shape's colour. Shapes appear in the render list for a frame in the order in which they are to be placed on the screen. Once the render list for the initial frame is generated a render list is generated for each subsequent frame by applying animation transforms obtained from the code words defined for that frame. In this way, to obtain frame 2, the animation transforms from the code words for frame 2 are applied to the shapes of frame 1. The animation transforms for frame 3 are then applied to the shapes of the resultant frame 2 to obtain frame 3. This process continues until all frames have been generated.

Whilst the screen is normally defined by coordinates ranging from 0 to 255 (unsigned byte), it is preferable when processing animated vector graphics that a signed 16 bit number is used to track shape positions. In this manner it is possible for a shape to be partially or completely off screen.

Figure 7:
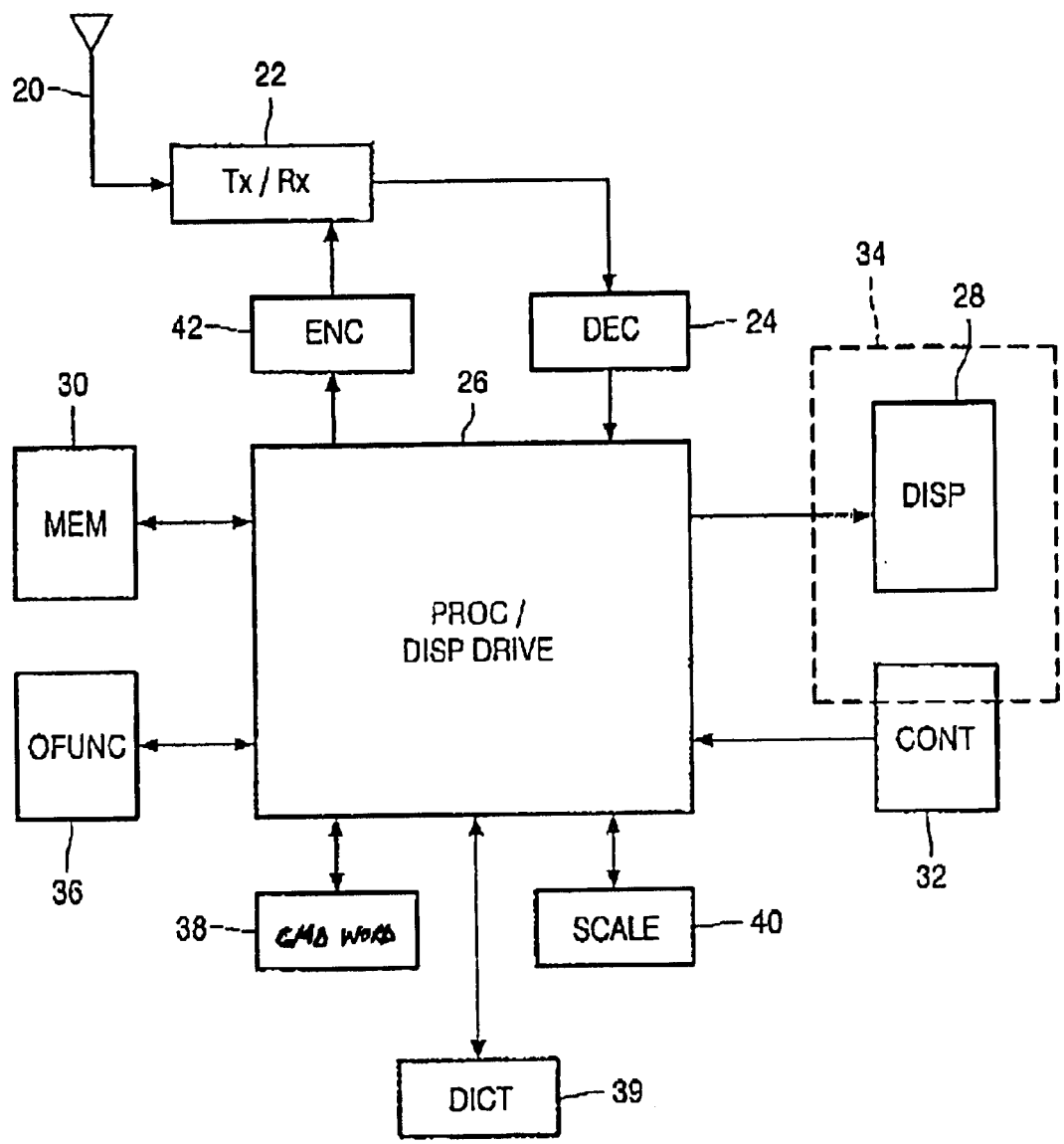
FIG. 7 is a block schematic of a receiver apparatus suitable to embody the present invention.

A block schematic diagram of a mobile/hand-held receiver configured to receive and handle the component object encoded messages is shown in FIG. 7. The functioning of many of the component parts will be well understood by the skilled reader and, other than in terms of their bearing on the operation of the present invention, they will not be described in detail.

From an aerial 20 or other signal input, the received signal is passed via transceiver 22 and decoder 24 stages to a central processing unit 26, which unit also (in this embodiment) handles the function of display driver formatting graphical and text data into display commands for output to display screen 28. An apparatus memory 30 is coupled with the processor and holds basic operating data and programs for the device. The memory 30 may also store the last recreated image, acting as a frame buffer for the display 28; alternately a separate (dedicated) memory may be provided. User input to the processor 26 is via controls 32: these may be in the form of a simple keypad and/or they may be combined with the display 28 through a touch-screen arrangement, as indicated by dashed line 34. Other conventional functions of the device (for example audio handling) are illustrated generally at 36.

Coupled with the processor 26 is a further store 38 containing the command word codes (see FIGS. 3 and 6) to enable the processor/display driver 26 to interpret received command words, to recreate the encoded image and to animate it: this memory may also hold the table of ASCII codes for text strings. A memory 39 is coupled to the processor and is arranged to hold a dictionary capable of storing shapes in the form of one or more defined objects and one or more render lists defining frames in terms of shapes from the dictionary. Also coupled with the processor 26 is a scaling stage 40 which may comprise a simple hardware arrangement of multipliers to convert the image field coordinates in the received data stream to fit the available area and aspect ratio of the display device 28. Finally, output signals from the processor 26 such as speech messages, indications of object selections, or new graphic images generated on the device (by user operation of the controls 32) are sent via encoder 42 to the transceiver 22 for sending.

As will be recognised, many variations are possible on the arrangement of FIG. 7. For example, the command word code store 38 and memory 39 may be incorporated with the general device memory 30. Also, the decoder 24/encoder 42 and/or scaling circuit 40 functions may be embodied completely in software and carried out in processor 26. Alternatively or additionally, the display driver functions of the processor may be handled by a separate unit, optionally with a display memory from which display data would be read out.

A vector graphics engine in the form of a processor and memory device may be incorporated into the controller of display device 28. In this manner, a vector graphics file can be displayed by passing the file to the display controller and asking it to render each frame in turn. In performing image processing and generation in the display controller, internal traffic is reduced compared to the normal model in which a display is driven by a central processor. Such a configuration would be particularly advantageous for mobile handsets such as mobile telephones with limited resources.

Touch-screens 34 are highly suited to graphical displays. They provide not only a method for object selection but also for object creation. Such an input mechanism coupled with the encoding mechanism would allow graphical information to be packed into a message that could be sent and decoded at the receiver to enable graphics to be exchanged between mobile devices.

Figures 8, 9:
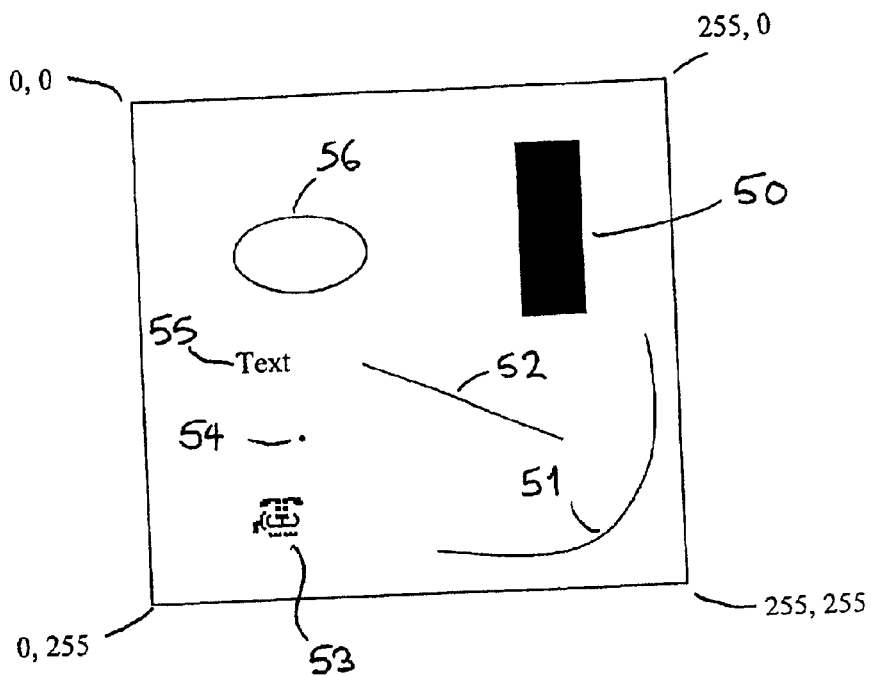
FIG. 8 is a further example of a component image.
FIG. 9 is a table of the respective properties of each of the objects in the image of FIG. 8.

As will also be recognised, variations are also possible in the types of component objects and functional command words supported. FIG. 8 is a further example of a component image, again using scalable XY co-ordinates but now with a range in each direction of 0–255, the Figure showing examples of some additional component objects. As with FIG. 2, FIG. 9 is a table of the respective properties of each of the objects in the image of FIG. 8.

The black rectangular object 50 is specified as for the FIG. 1 objects, with the location of the four corners specified in terms of the XY co-ordinate system, black specified as the colour for the object, and a fill command specifying all internal pixels to the specified colour.

The curve 51 is a Bezier curve, specified in terms of the XY co-ordinate system as a start point X0,Y0, end point X3,Y3, and a pair of intermediate guide points X1,Y1 and X2,Y2. A Bezier curve algorithm calculates the pixel positions on a line passing through the four points.

The line 52 is simply specified by start and end co-ordinates (and as a line, rather than the polygon 11 with one edge, as in FIG. 1). Polylines—sequences of lines joined end to end—may also be specified as a sequence of XY co-ordinates.

The character at 53 is defined by a bitmap, with the required data being the file size, XY co-ordinate location for the character, and the bitmap data itself.

The point at 54 is simply specified as a colour and an XY location: unlike point 16 in FIG. 1, no radius need be specified (see description of object 56 below).

The text string at 55 is specified with a starting XY co-ordinate and a null-terminated string of ASCII characters.

The ellipse 56 (which may be filled or unfilled as for a polygon) is specified as a centre XY co-ordinate and with respective radii specified for the X and Y directions. As will be recognised, specifying common XY radii will produce a circle where the aspect ratio of the display is 1:1, or differing radii may be chosen to result in a display of a circle after aspect ratio conversion to a ratio other than 1:1 is accomplished. With specification of ellipse supported, the above-mentioned point object 54 need not specify a radius.

A further object type that may be supported is the child shape, that is to say an object appearing within a large parent shape, an example of which is white filled polygon 14 within black filled polygon 13 in FIG. 1. The child shape object is specified as an XY co-ordinate location within a parent shape, and may also include an instruction for scaling up or down the size of the child object relative to the parent.

In addition to the above-described further object types, additional command words may be supported to increase the variety and animation available for displayed shapes. One such command word is a motion vector, used to specify the movement of an object from a starting XY co-ordinate location, rather than having to sequentially specify a sequence of XY co-ordinate locations for an object moving about the display. A further command may be to repeat a sequence of operations a given number of times: the command is identified by first and second words indicating respectively the start and end of the sequence of operations to be looped through, with the first word ("Begin Loop") indicating the number of repetitions to be undertaken. If a loop value of zero is chosen, the selected operations will continue to cycle until the image (or at least the part of it affected by the selected operations) is deselected for display.

A wide variety of application areas are possible including: user configurable user interfaces, message construction using server clip-art, car map navigation, traffic information, a whole host of interactive games including chess and draughts etc. A touch-screen user interface using the encoding techniques described allows the pen to draw while the device phone encodes the drawing. Using this input mechanism, messages may be personalised by allowing drawing and handwritten text to be incorporated in messages exchanged between mobile appliances.

From the foregoing, it will be seen that we have provided a mechanism whereby animated objects may be coded in a format optimised for low bit-rate mobile data communications. The coding scheme allows animations to be defined with respect to relative screen coordinates enabling the animations to be rendered in a device-independent manner.

From reading the present disclosure, other modifications will be apparent to persons skilled in the art. Such modifications may involve other features which are already known in the design, manufacture and use of interactive image coding equipment and component parts thereof and which may be used instead of or in addition to features already described herein.

What is claimed is:

1. A method for generating and coding for transmission an animated graphic image, comprising the steps of:
    composing a first frame of the image from a plurality of component objects from a predetermined set of object types, the composition including scaling and location of each object within a fixed coordinate set image field;
    coding the first frame as an ordered rendering list of the component objects, the rendering list identifying the order in which the component objects are to be rendered on regeneration of the image;
    sequentially coding each subsequent frame (n) as a number of animation command words representing respective animation transforms between the frame (n) and a previous frame (n−n1).

2. A method as claimed in claim 1, wherein the data words coding each subsequent frame (n) identify new component objects to be added or component objects from the previous frame (n−1) to be moved, transformed or removed.

3. A method as claimed in claim 1, further comprising the step of defining a shape as a plurality of component objects, wherein the definition of the shape is transmitted with the animated graphic image and wherein reference to the shape in the animated graphic image are replaced with the component objects when generated.

4. A method as claimed in claim 1, further comprising the step of defining an object shape in a bit map for at least one component object in the composed frame.

5. A method as claimed in claim 1, wherein the data words include selected ones of place object, place shape, move absolute, move relative, resize and remove.

6. A method as claimed in claim 1, wherein the data words specify a motion vector identifying a movement pattern for a respective object from which the object position in a subsequent frame may be determined.

7. A portable communications apparatus configured to receive and decode animated graphics images generated and coded in accordance with the method of claim 1, the apparatus comprising:
    a display device coupled with a display driver system arranged to format images for display;
    a processor arranged to reconstruct the coded image;
    a receiver coupled with said display driver, being configured to receive the coded image data and pass it to the processor;
    first storage means containing said object and animation identifier codes, and second storage means for storing reconstructed image frames;
    wherein the processor is arranged to reconstruct individual frames of the animation by identifying and reconstructing objects from object identifier codes and by applying animation transforms to objects from previous frames in dependence on animation codes.

8. A portable communications apparatus according to claim 7, wherein the display driver system includes the processor, the first storage means and the second storage means.

9. A portable communications apparatus according to claim 7, wherein the display driver system is a vector graphics system.

* * * * *